United States Patent [19]

Cheklich

[11] Patent Number: 4,466,408
[45] Date of Patent: Aug. 21, 1984

[54] APPARATUS FOR CLOSED-LOOP COMBUSTION CONTROL IN INTERNAL COMBUSTION ENGINES

[75] Inventor: George E. Cheklich, Oakland, Mich.

[73] Assignee: The United States of America as represented by the Secretary of the Army, Washington, D.C.

[21] Appl. No.: 474,087

[22] Filed: Mar. 10, 1983

[51] Int. Cl.³ .............................................. F02P 5/04
[52] U.S. Cl. .................................... 123/425; 123/480
[58] Field of Search .............. 123/425, 416, 472, 478, 123/480, 53 R; 73/118, 861.63

[56] References Cited

U.S. PATENT DOCUMENTS

| | | | |
|---|---|---|---|
| 3,964,443 | 6/1976 | Hartford | 123/416 |
| 4,153,019 | 5/1979 | Laubenstein et al. | 123/425 |
| 4,250,858 | 2/1981 | Jeenicke et al. | 123/416 |
| 4,290,398 | 9/1981 | Hattori et al. | 123/425 |
| 4,327,688 | 5/1982 | Lowther | 123/425 |
| 4,328,779 | 5/1982 | Hattori et al. | 123/425 |
| 4,401,079 | 8/1983 | Aoki et al. | 123/425 |

Primary Examiner—Raymond A. Nelli
Attorney, Agent, or Firm—Peter A. Taucher; John E. McRae; Robert P. Gibson

[57] ABSTRACT

Schematically disclosed is an engine control apparatus wherein cylinder pressure is sensed before and after the top dead center position. Desired cylinder pressure curves are stored in a microcomputer for a range of engine speed-load combinations. By electrically comparing the actual pressure-time curve with the desired pressure curve for the existing speed-load combination it should be possible to generate an error signal representing deviation of actual engine performance from the desired performance, i.e., a permissible plus or minus band following the desired curve. The invention would provide a control action using only three parameters, namely engine speed, engine load and cylinder pressure.

4 Claims, 2 Drawing Figures

APPARATUS FOR CLOSED-LOOP COMBUSTION CONTROL IN INTERNAL COMBUSTION ENGINES

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to a mechanism for monitoring operating conditions of an internal combustion engine to produce a signal for controlling fuel injection system parameters. The mechanism senses the magnitude of combustion chamber peak pressure and the time occurrence of the peak pressure on a pressure-time curve. The mechanism also detects the rate of pressure rise curve during the compression/power stroke to permit adjustment of the fuel injection timing, ignition timing, and the fuel quantity required to bring the rate of combustion pressure rise and peak cylinder pressure within acceptable limits for the given power demand. Included in the mechanism is a microcomputer that contains a read-only memory containing optimum pressure-time curves for a range of engine loads and engine speeds. The predetermined stored curves are selectively compared with sensed values of engine load and speed to generate desired fuel injection parameter and ignition actuation/timing control signals. In some respects, the mechanism has functional similarities to mechanisms disclosed in U.S. Pat. No. 4,250,858 to Jeenicke et al., U.S. Pat. No. 4,257,377 to Kingugawa et al., and U.S. Pat. No. 4,309,971 to Chiesa et al. Those patents disclose microcomputers for at least partially controlling the combustion cycles of internal combustion engines.

THE DRAWINGS

The invention will be described in connection with a conventional pressure-ignition engine. Certain features of the invention could also be used to control combustion in spark-ignition engines or continuous combustion systems (e.g., for adjusting burner operation on the basis of computer-generated performance feed-back information).

The principal thought behind this invention is to use sensor devices and a computer to collect information on engine performance during selected periods of operation (e.g. between approximately ninety degrees before top dead center and ninety degrees after top dead center), and to compare such information with desired optimum results preprogrammed into the computer for the then-existing engine load and speed conditions; an error signal generated by the computer acting through the control apparatus, brings the ensuing engine combustion performance within acceptable limits. As applied to pressure-ignition engines, the invention will hopefully overcome engine or fuel idiosyncrasies that are not addressed with conventional control systems; e.g., fuel pump tolerances affecting fuel pressure or fuel quantity, injector performance variables, combustion chamber cooling rate variations, air temperature variations, inertia factors associated with acceleration-deceleration phenomena, engine production stack-up differences, calibration, temperature effects and tolerances on condition sensor systems, fuel detonation and other properties.

Figure 1:
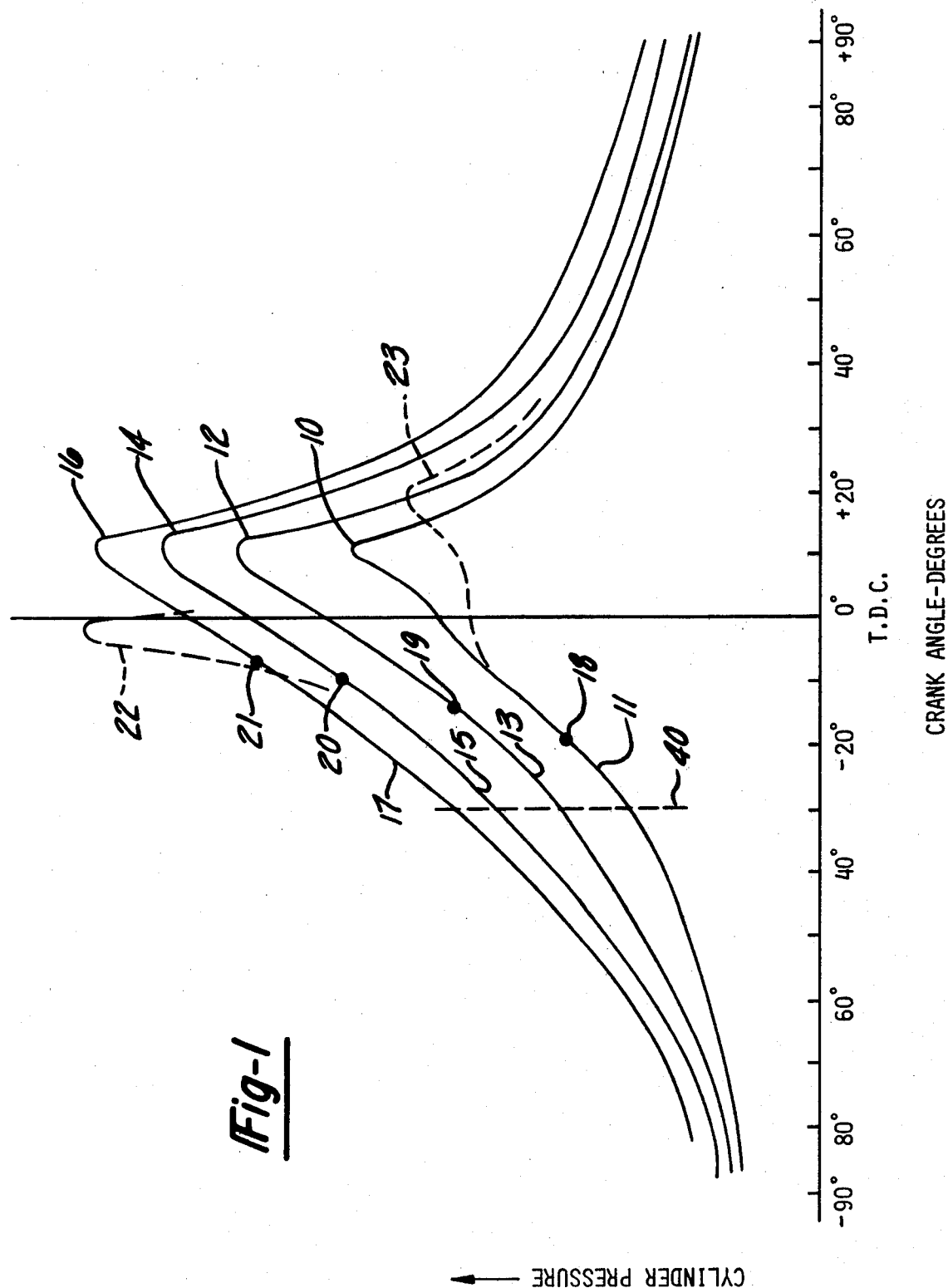
FIG. 1 is a set of curves depicting pressure changes vs. time (crank angle degrees) occurring in an engine cylinder at a given engine speed under four selected loadings, ranging from one-quarter load to full load.

Referring in greater detail to FIG. 1, there is shown therein pressure values occuring in a compression ignition engine combustion chamber from a point approximately ninety degrees in advance of top dead center to a point ninety degrees after top dead center. A fuel injector is employed to begin injecting fuel into the cylinder before top dead center; the resultant combustive reaction between atomized fuel and hot pressurized gas and/or positive ignition source, produces a pressure peak 10, 12, 14 or 16 at an optimum location after top dead center. Peak 10 on curve 11 is assumed to be at one quarter engine load condition, peak 12 on curve 13 is assumed to be at one half load, peak 14 on curve 15 is assumed to be at three quarter load, and peak 16 on curve 17 is assumed to be at full load. Fuel injection starting points are shown at 18, 19, 20 and 21 for the different loadings. Curve 22 illustrates an undesired situation involving an excessively steep pressure rise experienced after the start of fuel injection; the pressure peak occurs at or before top dead center, a very unfavorable condition harmful to the engine and not conducive to good power or fuel economy performance. Curve 23 illustrates another undesired curve or condition wherein the pressure rise after start of fuel injection is insufficient and combustion occurs too late for satisfactory engine performance.

The FIG. 1 curves are assumed to be at one particular engine speed, e.g., 2000 revolutions per minute. A series of such curves can be developed for various different engine speeds, e.g., 2,200 r.p.m., 2,600 r.p.m., etc. Generally speaking, at the higher engine speeds the peak pressures will normally be slightly higher, compared to pressures at the lower speeds. In each situation it is desired to achieve the peak pressure shortly after top dead center while the piston-cylinder clearance volume is relatively small, so as to approach constant volume combustion. Achievement of the optimum rate of pressure rise and the optimum peak pressure at the optimum time requires different programming of the fuel injection system and/or ignition timing in accordance with variations in such operating parameters as engine speed and load. The fuel injector mode of operation and fuel quantity delivered can be adjusted by varying the time at which injection is started (FIG. 1) and/or the duration of the injection period, and/or the injection pressure. Also, the actuation time occurrence and duration/intensity of the positive ignition source can be similarly controlled depending on speed and load conditions.

In one conventional control system the load demand on the engine is determined by the extent to which the human operator depresses the accelerator pedal. Pedal depression adjusts the position of a fuel control rack that determines the quantity of fuel injected into the engine cylinder per unit time period, i.e., the higher the load the greater the quantity of fuel injected per cycle. In this illustrative system engine load is used to control the instant when injection is started, i.e., points 18, 19, 20 or 21 in FIG. 1; disregarding other factors, the start of injection will be advanced (to the left in FIG. 1) at lower engine loads and retarded at higher engine loads.

The duration of the injection period may be controlled by engine speed-load conditions.

I propose a modified control system wherein a computer generates feed-back information related to deviations of the actual pressure-time curve from an optimum curve stored in the computer for each preselected speed/load condition. The feedback information is used to modify the control signals applied to the fuel injection and/or positive ignition system as applicable, to bring combustion performance within predetermined acceptable limits. Rate of pressure rise during the fuel injection period may be used as a secondary control parameter to limit and/or properly time the occurence of peak cylinder pressure in relation to crank angle, e.g., to prevent the undesired curve 22 in FIG. 1, wherein rate of pressure rise is too steep and peak pressure occurs before top dead center (TDC), resulting in excessive negative work, harsh noisy combustion and other undesirable effects.

Figure 2:
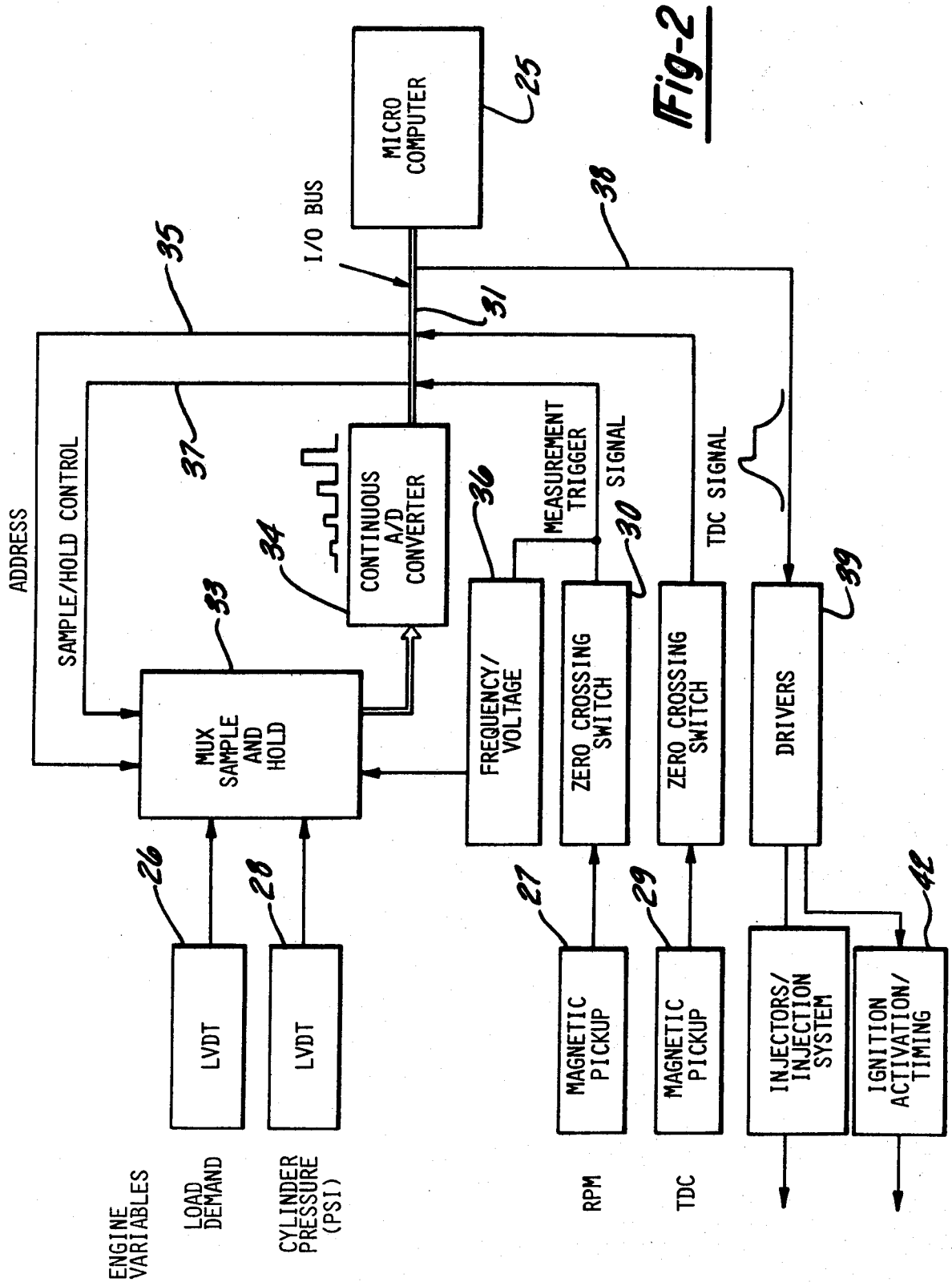
FIG. 2 is a schematic illustration of the control apparatus embodying my invention.

FIG. 2 diagrammatically illustrates one form of mechanism I have devised to program a fuel injection system and/or positive ignition system. The mechanism includes a conventional microcomputer 25 that comprises a microprocessor, electronic clocks, read-only memory, input/output devices, and interface components. The memory includes stored values for desired optimum pressure-time curves at different engine load and speed conditions. For example, if we arbitrarily compile optimum data for four engine loadings at each of twelve different speeds, e.g., 600 r.p.m. through 2,800 r.p.m. in 200 r.p.m. increments, we will have forty-eight different pressure-time curve profiles in the memory storage; each curve profile can be in the form of digital signals related to pressure-time profiles desired during selected portions of the cycle.

The FIG. 2 mechanism includes means 28 for sensing actual combustion chamber pressure, means 26 for sensing actual engine load, means 27 for sensing actual engine speeds, and means 29 for sensing top dead center position (or some other known reference point). The sensor 26 load signal and sensor 27 r.p.m. signal are applied to the in/out (I/O) bus 31 associated with microcomputer 25 to select the correct optimum pressure-time curve from the read-only memory. Thus, while the microcomputer might contain, for example, forty-eight stored optimum pressure-time curve profiles, only the selected profile need be used in any one operational cycle. The criteria for selection of the appropriate pressure-time curve profile are engine speed and load.

Sensed values at 26 and 28 are inputted to different channels in a multiplexer (MUX) 33; they are subsequently converted to digital form in converter 34. An address line 35 controls multiplexer 33 so that multiplexer outputs are delivered to the analog-digital converter at specific intervals, e.g., every one or two or more crank angle degree(s). After each output from the multiplexer to convert 34 the sample-hold control line 37 from the r.p.m. sensor 27 puts the multiplexer back into the sample mode for receiving new signals from the various sensors 26 and 28. The zero crossing switch 30 associated with sensor 27 acts through a frequency/voltage transducer 36 to translate the r.p.m. signal into analog form suitable for handling by multiplexer 33. Sensor 28 signal values are applied through the multiplexer to the analog-digital converter at regular time intervals (e.g., every one or two or more crank degrees) from a point approximately ninety degrees in advance of top dead center to a point approximately ninety degrees after top dead center, or as required to adequately sample the combustion-affected portion of the cycle, thereby producing an actual pressure-time curve that can be differentiated and continuously compared with the selected stored optimum curve profile in the read-only memory. If the actual pressure-time curve profile differs outside of preselected limits from the selected pre-programmed stored pressure-time curve for the existing speed-load condition the microcomputer 25 generates an error signal that modifies the timing signal passed through line 38 to the electronic driver circuitry 39 for the fuel injection and/or positive ignition system. In this system the microcomputer controls the circuitry in the driver section 39; the line 38 signal is a computer-generated timing signal corrected in accordance with an error correction factor (if any) due to differences in the actual pressure-time curve and allowable limits of the preprogrammed stored pressure-time curve. Combustion performance is monitored continuously and correction signals generated as required to achieve closed-loop control of the combustion process.

The error signal will be related to the magnitude of the actual peak pressure, e.g., peak 16 in FIG. 1, in comparison to the magnitude of the peak pressure in the stored optimum profile curve. The error signal will also be related to the time at which the actual peak pressure is achieved compared to the optimum time dictated by the stored curve, i.e., the number of degrees after top dead center. The slope of the curve before (and after) the peak pressure point is of particular interest for combustion performance reasons and is required to provide the desired overall control of combustion.

The signal produced by microcomputer 25 compensates for any idiosyncracies of the particular system, such as fuel quality, calorific heating values, fuel volatility variances, ambient air variations, combustion chamber wall temperature differences, injector wear, etc. During the next fuel injection cycle the corrected signal applied through line 38 to driver 39 counteracts the effect of these unique system error factors on ignition and combustion performance. Primary control of fuel injector action is in accordance with actual engine load and engine speed at the decision point, e.g., point 40 in FIG. 1.

During the time period between ninety degrees before top dead center and the fuel injector starting point, e.g., point 21, the microcomputer system will be monitoring pressure, load demand and engine speed values. The injector action, as regards quantity, starting time and duration of injection, and ignition system actions, are controlled by actual conditions existing at the decision point 40, and as modified by the experience realized during the previous cycle. The closed loop feedback information developed by the microcomputer should to a great extent minimize possible occurrence of undesired profile of premature or delayed pressure rise or undesired time occurrence of peak cylinder pressure (curves 22 and 23). However, if sufficiently responsive electronics are used it is believed possible to modify the injection action after the start of injection, to eliminate the undesired conditions represented by curves 22 and 23. By monitoring the slope of the curve between the start of injection and some arbitrary point, e.g., ten degrees after start of injection, it should be possible for the microcomputer to generate an alarm signal for either terminating or modifying the injector action prematurely (situation 22) or artificially igniting the fuel-air mixture to achieve the desired pressure time profile.

FIG. 2 shows in block diagrammatic form an ignition activation and timing means 42 for igniting the mixture artificially e.g., via a spark plug. The illustrated computer-controlled system could be modified by the addition of an ambient temperature sensor to adjust the program-generated signals to achieve optimum ignition during start-up under wide variations in ambient temperature (e.g., minus 65° F. to 110° F.).

It is believed that use of the invention would optimize engine performance, power output, and fuel economy. Additionally, use of the invention would permit optimized operation on alternative fuels of varying ignition/combustion quality. Hopefully, engine reliability and durability would be improved due to smoother combustion and better control in equalizing peak cylinder pressure limits between the various cylinders. A more uniform control of peak cylinder pressures would provide more nearly equal loadings among all cylinders. Startability would be improved due to the fact that the injector and ignition timing and fuel quantity control actions indirectly compensate for engine idiosyncrasies, existing conditions and environmental extremes. Smoother combustion would reduce combustion noise levels and could increase engine life.

I wish it to be understood that I do not desire to be limited to the exact details of construction shown and described for obvious modifications will occur to a person skilled in the art.

I claim:

1. Engine ignition control mechanism for an engine equipped with fuel injectors, said mechanism comprising computer means having a multiplicity of cylinder pressure-crank angle curves stored therein representing desired engine performance, each curve being for a different engine speed-load combination, whereby the multiplicity of curves establishes a desired engine operating map; each stored curve comprising digital signal means identifying desired rate of pressure change from a time prior to the fuel injector crank-open point to a time after the peak cylinder pressure point; means (26) sensing actual load demand, means (27) sensing actual engine speed, and means (28) sensing actual cylinder pressure; said computer means including a multiplexer, analog-digital converter and microcomputer; said multiplexer having an address line (35) and a sample-hold line (37); said multiplexer having separate input lines connected to said load demand sensing means (26) said speed sensing means (27), and said pressure sensing means (28); said multiplexer having an output line connected to the analog-digital converter for delivering thereto load demand signals, speed signals, and cylinder pressure signals; said computer means including in-out bus means (31) interconnecting the analog-digital converter and microcomputer; said stored pressure crank angle curves comprising digital signal means located in the microcomputer; said in-out bus means being operative to convey digitized actual load demand signals, actual speed signals and actual pressure signals to the microcomputer; means in the microcomputer responsive to digitized speed-load demand signals for selecting an associated stored curve from the aforementioned multiplicity of curves; means in the microcomputer for comparing the digitized actual pressure signal with the selected stored signal to develop an error signal representing deviation of actual engine performance from desired engine performance; the microcomputer including means for generating a control signal (38) effective to adjust the injector crack-open point, injection pressure and injector stay-open duration time, said control signal generating means being responsive to a previously developed error signal and the existing engine load and engine speed signals.

2. The mechanism of claim 1 wherein the engine ignition control mechanism includes a positive ignition means (42); said comparing means in the microcomputer being operative to energize or adjust the time occurrence of the positive ignition means when the error signal indicates an abnormally low rate of actual pressure rise during the fuel injection period.

3. The mechanism of claim 2 wherein said comparing means in the microcomputer is operative to prematurely modify or terminate fuel injector action when the error signal indicates an abnormally high or low rate of actual pressure rise.

4. The mechanism of claim 3 wherein the engine is intended to burn fuels of varying combustion quality; said comparing means being operative to generate a useful error signal when fuels of varying combustion quality are used.

* * * * *